TRIAZOLYL GOLDS

William John Chambers, Wilmington, Del., assignor to E. I. du Pont de Nemours and Company, Wilmington, Del.
No Drawing. Filed Sept. 15, 1971, Ser. No. 180,846
Int. Cl. C07d 55/06
U.S. Cl. 260—299                                             8 Claims

ABSTRACT OF THE DISCLOSURE

Novel triazolyl gold compounds useful for production of decorative gold films on substrates.

BACKGROUND OF THE INVENTION

This invention relates to organometallic compounds and more particularly, to organogold compounds.

Triazolyl golds in which the gold atom is bonded to a ring nitrogen are not known although pyridine gold (I) chloride, a complex in which pyridine is coordinated through its nitrogen atom to gold (I) chloride, is known. Kharasch and Isbell, J. Am. Chem. Soc., 52, 2919 (1930), describe aurous chloride coordinated with pyridine. Vaughn, J. Am. Chem. Soc., 92, 730 (1970) describes 2-pyridyl gold (I) and derivatives.

It is desirable to make an organogold base for decorative compounds which does not contain sulfur and hence will not evolve corrosive sulfur oxides upon firing decorated ware. An odorless organogold compound is likewise desirable.

SUMMARY OF THE INVENTION

The present invention is novel 1,2,4-triazolyl golds (I) in which the 3-position has hydrogen or alkyl groups of 1–11 carbon atoms. The term "alkyl" means hydrocarbon radicals, both acylic and cyclic, with and without alkyl substituents on the chain or ring. Included among such radicals are methyl, ethyl, propyl, butyl, isobutyl, pentyl, t-butyl, hexyl, heptyl, octyl, nonyl, decyl, undecyl, cyclohexyl, methylcyclohexyl, etc. These compounds exhibit primary bonding between gold and the triazole nitrogen, and possibly secondary intramolecular coordination. The organogolds of this invention are prepared by the reaction of a 3-substituted-1,2,4,-triazole with dimethyl sulfide gold (I) chloride in the presence of an acid acceptor. The triazolyl golds of this invention contain no sulfur or halogen atoms and are soluble in organic solvents and thermally decomposable; hence they are quite useful for depositing films which on firing decompose to attractive gold films.

DETAILED DESCRIPTION OF THE INVENTION

The compounds of the present invention include 1,2,4-triazolyl golds and 3-substituted-1,2,4-triazolyl golds, in which the 3-substitutent is a hydrocarbon group with 1–11 carbon atoms. The triazolyl golds of this invention are prepared by the reaction of complexed monovalent gold halide with the desired 1,2,4-triazole in the presence of an acid acceptor. The triazoles with 6–11 carbon alkyl substituents in the 3-position can be prepared as described in my copending application Ser. No. 180,845, filed on the same day as this application. Preferably the 1,2,4-triazoles are reacted with dimethyl sulfide complex of aurous chloride in the presence of a tertiary amine to give the desired product, with dimethyl sulfide and tertiary amine hydrochloride as by-products.

The organogolds of this invention have the advantage over prior organogolds used in decorative work that these triazolyl golds contain no sulfur or halogen atoms. Furthermore, these organogolds are characterized by very low odor levels. Organogolds having sulfur or halogen atoms evolve corrosive gases, sulfur oxides and hydrogen halides when fired in air. The following examples, in which parts and percentages are in weight unless otherwise specified, illustrate the invention.

EXAMPLE 1

1,2,4-triazolyl gold (I)

To a solution of 6.56 g. (0.01 mol) 30% gold liquor in 100 ml. water cooled to 5° C. there was added dropwise over 10 min. 1.86 g. (0.03 mol) dimethyl sulfide. The gold liquor contained 30% gold as $H_3AuCl_6$ in water. The mixture was stirred 30 min. at 0 to 10° C. The white solid dimethylsulfide complex of aurous chloride was collected on a filter and dried 10 min. To the gold complex in 25 ml. tetrahydrofuran was aded 0.69 g. (0.01 mol) 1,2,4-triazole followed by 1.01 g. (0.01 mol) triethylamine. The color of the reaction mixture changed from creamy yellow to light creamy yellow brown upon addition of the triethylamine. The solid 1,2,4-triazolyl gold collected on a filter was purple colored.

*Analysis.*—Calcd. for $C_2H_2N_3Au$ (percent): C, 9.1; H, 0.8; N, 15.9; Au, 74.2. Found (percent): C, 8.5; H, 0.6; N, 14.9; Au, 74.5.

EXAMPLE 2

3-methyl-1,2,4-triazolyl gold (I)

To a mixture of 0.62 g. (0.01 mol) dimethyl sulfide gold (I) chloride, prepared as in Example 1, and 50 ml. methanol there was added a solution of 0.83 g. (0.01 mol) 3-methyl-1,2,4-triazole and 2.02 g. (0.02 mol) triethylamine in 10 ml. methanol over 10 min. The reaction mixture was then stirred 60 min. at reflux temperature. The solid purple 3-methyl-1,2,4-triazolyl gold was collected on a filter. After drying the product weighed 2.67 g.; M.P., 240° C.

*Analysis.*—Calcd. for $C_3H_4N_3Au$ (percent): C, 12.9; H, 1.4; N, 15.1. Found (percent): C, 13.8, 13.7; H, 1.9, 2.1; N, 13.7, 13.9.

EXAMPLE 3

3-cyclohexyl-1,2,4-triazolyl gold (I)

To a suspension of 0.62 g. (0.01 mol) dimethyl sulfide gold (I) chloride, prepared as in Example 1, in 100 ml. dimethyl formamide was added a solution of 1.51 g. (0.01 mol) 3-cyclohexyl 1,2,4-triazole and 1.01 g. (0.01 mol) triethylamine in 10 ml. dimethyl formamide. The reaction mixture was stirred at 35–40° C. for 4 hours. The solid product that precipitated when the reaction mixture was poured into 500 ml. ice water was collected on a filter. After drying the solid 3-cyclohexyl-1,2,4-triazolyl gold weighed 3.1 g. and melted at 244–248° C. The product from a duplicate run weighed 2.69 g. and melted at 243–247° C.

*Analysis.*—Calcd. for $C_8H_{12}N_3Au$ (percent): C, 27.7; H, 3.5; N, 12.1; Au, 56.7. Found (percent): C, 28.7; H, 3.5; N, 11.4; Au, 54.7.

EXAMPLE 4

3-nonyl-1,2,4-triazolyl gold (I)

To a suspension of 4.97 g. (0.08 mol) dimethylsulfide gold (I) chloride, prepared as in Example 1, in 300 ml. dimethyl formamide cooled to 0–10° C. was added a solution of 15.62 g. (0.08 mol) 3-nonyl-1,2,4-triazole in 80 ml. dimethyl formamide. Then there was added 8.88 g. (0.088 mol) triethylamine in 20 ml. dimethylformamide. The reaction mixture was stirred 60 min. at 0–10° C. then 60 min. at 40° C. The reaction mixture was poured into 500 ml. ice water, the solid product collected on a filter was washed with three 200 ml. portions of distilled water. After drying there was obtained 28.5 g. (91% of theory) of white solid 3-nonyl-1,2,4-triazolyl gold (I), M.P. 164–166° C.

*Analysis.*—Calcd. for $C_{11}H_{20}N_3Au$ (percent): C, 33.8; H, 5.2; N, 10.8; Au, 50.3. Found (percent): C, 35.3, 35.1; H, 5.3, 5.4; N, 10.5, 10.6; Au, 48.5, 48.1.

The number average molecular weight was 763, in chloroform, extrapolated to zero concentration (calculated for dimer, 783).

A differential scanning calorimeter scan showed endotherms at 64° C., 143° C. and 169° C., and an exotherm at 243° C., in air at a rate of 10° C./min.

Thermogravimetric analysis showed that significant weight loss begins at about 230° C. at 10° C./min. in air. Decomposition appears complete at about 330° C.

EXAMPLE 5

3-undecyl-1,2,4-triazolyl gold (I)

To a mixture of 2.49 g. (0.04 mol) dimethyl sulfide gold (I) chloride and 250 ml. dimethyl formamide at 5° C. was added dropwise a solution of 9.83 g. (0.044 mol) 3-undecyl-1,2,4-triazole in 40 ml. dimethyl formamide with stirring. After stirring 5 min. a solution of 4.44 g. (0.044 mol) triethylamine in 10 ml. dimethylformamide was added dropwise. The reaction mixture was stirred 30 min. at 8–10° C., then 45 min. at 40° C. and finally poured into 1 liter ice water with stirring. The solid product was collected on a filter, washed with three 200 ml. portions of distilled water, and then dried. There was obtained 16.7 g. of crude white solid 3-undecyl-1,2,4-triazole (M.P. 150–158° C. with decomposition), representing 93.4% of theoretical yield after correcting for excess triazole used.

Calcd. for $C_3H_{24}N_3Au$ (percent): C, 37.2; H, 5.8; N, 10.0; Au, 47.0. Found (percent): C, 38.9, 38.4, 38.7; H, 5.8, 5.9, 6.4; N, 9.9, 9.7, 10.0; Au, 44.2.

What is claimed is:

1. 3-X-1,2,4-triazolyl gold (I) compounds, wherein X is H or a straight-chain alkyl group of 1–11 carbon atoms.
2. A compound according to claim 1 wherein X is H.
3. 3-X-1,2,4-triazolyl gold (I) compounds wherein X is a cycloalkyl group selected from the class consisting of cyclohexyl and methylcyclohexyl.
4. A compound according to claim 3 wherein X is cyclohexyl.
5. A compound according to claim 1 wherein X comprises a straight-chain alkyl radical.
6. A compound according to claim 5 wherein X is methyl.
7. A compound according to claim 5 wherein X is nonyl.
8. A compound according to claim 5 wherein X is undecyl.

No references cited.

RICHARD J. GALLAGHER, Primary Examiner

U.S. Cl. X.R.

29—199; 75—83